(12) United States Patent
Lee

(10) Patent No.: US 10,473,022 B2
(45) Date of Patent: Nov. 12, 2019

(54) COOLANT CONTROL VALVE UNIT, AND ENGINE COOLING SYSTEM HAVING THE SAME

(71) Applicants: Hyundai Motor Company, Seoul (KR); Kia Motors Corporation, Seoul (KR)

(72) Inventor: Hyo Jo Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/014,807

(22) Filed: Jun. 21, 2018

(65) Prior Publication Data
US 2019/0145303 A1    May 16, 2019

(30) Foreign Application Priority Data
Nov. 10, 2017    (KR) .................... 10-2017-0149124

(51) Int. Cl.
| | |
|---|---|
| F01P 7/16 | (2006.01) |
| F16K 3/00 | (2006.01) |
| F01P 11/16 | (2006.01) |
| F01P 3/02 | (2006.01) |
| F16K 31/524 | (2006.01) |
| F01P 7/14 | (2006.01) |

(52) U.S. Cl.
CPC ............. *F01P 7/161* (2013.01); *F01P 3/02* (2013.01); *F01P 11/16* (2013.01); *F16K 31/52408* (2013.01); *F01P 2007/146* (2013.01); *F01P 2025/40* (2013.01); *F01P 2060/04* (2013.01); *F01P 2060/18* (2013.01)

(58) Field of Classification Search
CPC .. F01L 2810/01; F16K 15/18; F16K 31/0651; F16K 3/246; F16K 3/267; F01P 2007/146; F01P 7/14
See application file for complete search history.

(56) References Cited

U.S. PATENT DOCUMENTS

| | | | | |
|---|---|---|---|---|
| 5,186,393 A | * | 2/1993 | Yie ........................ | B05B 1/306 137/509 |
| 6,659,050 B1 | * | 12/2003 | Creech .................... | F01P 7/167 123/41.08 |
| 6,733,352 B1 | * | 5/2004 | Belter ..................... | F01P 7/167 440/1 |

(Continued)

FOREIGN PATENT DOCUMENTS

KR           101744834 B1    6/2017

*Primary Examiner* — Long T Tran
(74) *Attorney, Agent, or Firm* — Mintz Levin Cohn Ferris Glovsky and Popeo, P.C.; Peter F. Corless

(57) ABSTRACT

A coolant control valve unit includes a valve housing including at least a first passage and a second passage in which coolant flows and disposed at a predetermined position, a first valve and a second valve provided to open and close the first and second passages, a first stem and a second stem respectively connected with the first valve and the second valve and extending to movement directions of the first valve and the second valve, a driving plate of which one surface is connected with end portions of the first stem and the second stem, and an actuator pushing and pulling the driving plate to allow the first valve and the second valve to open and close the first passage and the second passage.

15 Claims, 6 Drawing Sheets

(56) References Cited

U.S. PATENT DOCUMENTS

2010/0140518 A1* 6/2010 Billings .................... F16K 3/24
  251/129.01
2017/0204987 A1* 7/2017 Jackson .............. F16K 31/1262

* cited by examiner

COOLANT CONTROL VALVE UNIT, AND ENGINE COOLING SYSTEM HAVING THE SAME

CROSS-REFERENCE TO RELATED APPLICATION

This application claims under 35 U.S.C. § 119(a) the benefit of Korean Patent Application No. 10-2017-0149124 filed in the Korean Intellectual Property Office on Nov. 10, 2017, the entire contents of which are incorporated herein by reference.

BACKGROUND

(a) Technical Field

The present disclosure relates to a coolant control valve unit and an engine cooling system having the same in which coolant is supplied to a cylinder block and a cylinder head, and the supplied coolant is distributed to cooling components to reduce warm-up time of the engine and fuel consumption.

(b) Description of the Related Art

An engine generates torque by burning fuel, and exhausts heat energy of the burned fuel to the outside. Particularly, a coolant absorbs heat energy while circulating through the engine, and dissipates the absorbed heat energy to the outside through a radiator.

If a coolant temperature of the engine is low to elevate oil viscosity, it is typical that friction force and fuel consumption increase and a temperature of exhaust gas rises slowly, thus prolonging a time period of catalyst activation and making a quality of the exhaust gas poor. In addition, a time period for bringing a heater function to a normal level typically takes a long time.

If the coolant temperature of the engine is excessive, knocking may take place, and, if ignition timing is adjusted for suppressing the knocking, performance of the engine will likely become poor. Also, if a lubrication oil temperature is excessive, a lubrication action is likely to become poor.

Accordingly, a proposed solution is to utilize one coolant control valve unit for controlling a plurality of cooling elements such that the coolant temperature is high at a particular portion of the engine and low at another portion of the engine.

Meanwhile, to control the coolant distributed to a radiator, a heater, and an oil cooler by using the one coolant control valve unit, a plurality of valves and a cam lifting these valves respectively are disposed.

As a result of the above proposed solution, friction abrasion is generated between the cam and the valves to form a gap between the cam and the valves, and thus durability may be deteriorated and maintenance cost increased.

The above information disclosed in this Background section is only for enhancement of understanding of the background of the disclosure and therefore it may contain information that does not form the prior art that is already known in this country to a person of ordinary skill in the art.

SUMMARY

An object of the present disclosure is to provide a coolant control valve unit, and an engine cooling system having the same in which friction abrasion generated from a stem in which a valve is formed and a cam is reduced to improve durability and improve control accuracy.

A coolant control valve unit according to an exemplary embodiment of the present disclosure includes a valve housing including at least a first passage and a second passage in which coolant flows and disposed at a predetermined position, a first valve and a second valve provided to open and close the first and second passages, a first stem and a second stem respectively connected with the first valve and the second valve and extending to movement directions of the first valve and the second valve, a driving plate of which one surface is connected with end portions of the first stem and the second stem, and an actuator pushing and pulling the driving plate to allow the first valve and the second valve to open and close the first passage and the second passage, wherein the first passage and the second passage respectively have a first length H1 and a second length H2 which are predetermined such that initially the first passage is opened and then the second passage is opened while the actuator lifts the first valve and the second valve by the driving plate.

The coolant control valve unit according to an exemplary embodiment of the present disclosure may further include a third valve provided to open and close a third passage which is formed in the valve housing, and a third stem connected with the third valve, extending to a movement direction of the third valve, and an end portion of which is connected with one surface of the driving plate, wherein the third passage has a third length H3 which is predetermined such that initially the first passage is opened, then the second passage is opened, and then the third passage is opened while the actuator lifts the first valve, the second valve and the third valve by the driving plate.

The second length H2 may be larger than the first length H1, and the third length H3 may be larger than the second length H2.

Inlets into which coolant enters through one side of the first valve, the second valve and the third valve may be provided at the valve housing.

The valve housing may include a first outlet from which the coolant that passed through the first passage is discharged by opening of the first valve, a second outlet from which the coolant that passed through the second passage is discharged by opening of the second valve, and a third outlet from which the coolant that passed through the third passage is discharged by opening of the third valve.

The coolant control valve unit according to an exemplary embodiment of the present disclosure may further include a driving rod connected with the other surface of the driving plate, and the actuator may push or pull the driving rod.

An engine cooling system according to an exemplary embodiment of the present disclosure includes a cylinder head disposed on a cylinder block and a coolant control valve unit disposed at a coolant outlet of the cylinder head and to which coolant discharged from the cylinder head and the cylinder block is supplied and distributing the supplied coolant to coolant components, wherein the coolant control valve unit includes a valve housing including at least a first passage and a second passage in which the coolant flows and disposed at a predetermined position, a first valve and a second valve provided to open and close the first and second passages, a first stem and a second stem respectively connected with the first valve and the second valve and extending to movement directions of the first valve and the second valve, a driving plate of which one surface is connected with end portions of the first stem and the second stem, and an actuator pushing and pulling the driving plate to allow the first valve and the second valve to open and close the first passage and the second passage, wherein the first passage and the second passage respectively have a first length H1 and a second length H2 which are predetermined such that initially the first passage is opened and then the second passage is opened while the actuator lifts the first valve and the second valve by the driving plate.

The engine cooling system according to an exemplary embodiment of the present disclosure may further include a third valve provided to open and close a third passage which is formed in the valve housing and a third stem connected with the third valve, extending to a movement direction of the third valve, and an end portion of which is connected with one surface of the driving plate, wherein the third passage has a third length H3 which is predetermined such that initially the first passage is opened, then the second passage is opened, and then the third passage is opened while the actuator lifts the first valve, the second valve and the third valve by the driving plate.

The second length H2 may be larger than the first length H1, and the third length H3 may be larger than the second length H2.

Inlets into which coolant enters through one side of the first valve, the second valve and the third valve may be provided at the valve housing.

The valve housing may include a first outlet from which the coolant that passed through the first passage is discharged by opening of the first valve, a second outlet from which the coolant that passed through the second passage is discharged by opening of the second valve, and a third outlet from which the coolant that passed through the third passage is discharged by opening of the third valve.

The engine cooling system according to an exemplary embodiment of the present disclosure may further include a driving rod connected with the other surface of the driving plate, and the actuator may push or pull the driving rod.

The first passage may be connected with a low pressure EGR cooler cooling the exhaust gas recirculating from an exhaust line to an intake line and a heater disposed to warm up indoor air of a vehicle.

The second passage may be connected with an EGR valve installed at an EGR line to control flow rate of the recirculating exhaust gas and an oil cooler disposed to cool the oil recirculating the cylinder block and the cylinder head.

The third passage may be connected with a radiator radiating the heat of the coolant to outside.

According to an exemplary embodiment of the present disclosure, the coolant control valve unit have a structure simultaneously lifting a plurality of valves and may solve a problem of abrasion between a cam and a stem.

Further, durability of the coolant control valve unit may be improved by reducing abrasion generated between the cam and the stem.

Further, connection structure between components may be simplified to reduce weight and production cost.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present disclosure will be described in detail with reference to the accompanying drawings.

Figure 1:
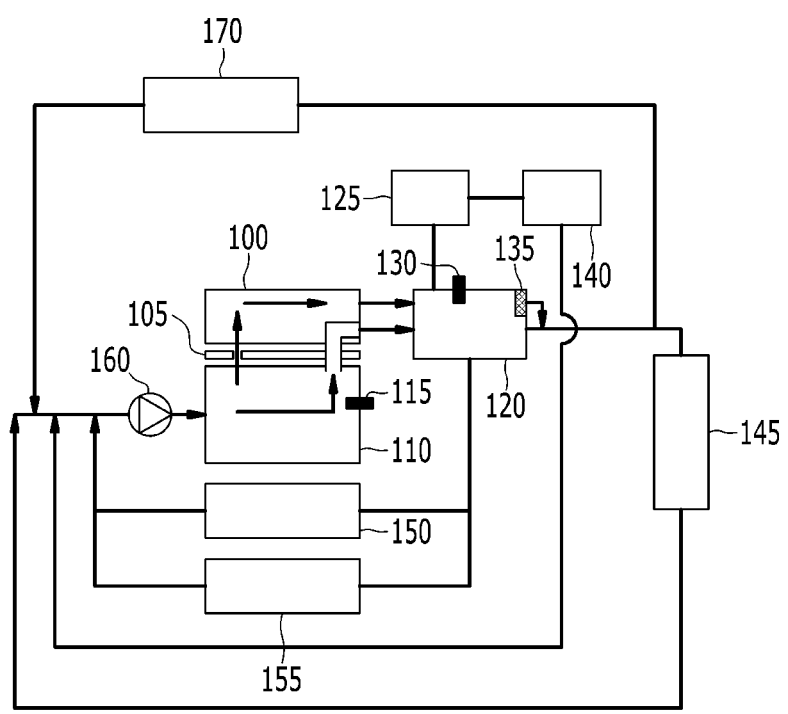
FIG. 1 is a block diagram of an engine cooling system according to an exemplary embodiment of the present disclosure.

FIG. 1 is a block diagram of an engine cooling system according to an exemplary embodiment of the present disclosure.

Referring to FIG. 1, an engine cooling system includes a cylinder head 100, a head gasket 105, a cylinder block 110, a block coolant temperature sensor 115, a coolant control valve unit 120, a valve coolant temperature sensor 130, a safety valve 135, a reservoir tank 170, a low EGR cooler 125, a heater 140, a radiator 145, an EGR valve 150, an oil cooler 155 and a coolant pump 160.

The cylinder head 100 is disposed on the cylinder block 110, and the head gasket 105 is interposed therebetween.

The coolant pump 160 is installed at one side of the cylinder block 110, and the coolant control valve unit 120 may be installed at the other side of the cylinder head 100.

Coolant pumped at the coolant pump 160 is supplied to an inner one side of the cylinder block 110, a portion of the coolant pumped to the cylinder block 110 passes through the head gasket 105 and be supplied to inner one side of the cylinder head 100, and the remaining amount of the coolant flows to an inner other side of the cylinder block 110.

The coolant flowed to the inner other side of the cylinder block 110 rises to pass through the head gasket 105 and be supplied to the coolant control valve unit 120 installed at the other side of the cylinder head 100.

The coolant supplied to the inner one side of the cylinder head 100 flows to the inner other side of the cylinder head 100 and is supplied to the coolant control valve unit 120 installed at the other side of the cylinder head 100.

The coolant control valve unit 120 may control the coolant passing through the cylinder block 110 to be discharged, and the discharged coolant that passed through the cylinder head 100 always recirculates to the coolant control valve unit 120 according to operation of the coolant pump 160.

The block coolant temperature sensor 115 detecting a coolant temperature passing the cylinder block 110 is provided in the cylinder block 110, and the valve coolant temperature sensor 130 detecting a coolant temperature passing the coolant control valve unit 120 in the coolant control valve unit 120.

The coolant control valve unit 120 controls the coolant distributed to the low pressure EGR cooler 125 and the heater 140, and controls the coolant distributed to the radiator 145, and always distributes the coolant to the low pressure EGR cooler 125 and the oil cooler 155.

The EGR line (not shown) is formed to be diverged from a downstream side of the turbocharger (not shown) and merged to an intake line, and the low pressure EGR cooler 125 is provided on the EGR line to cool the recirculation exhaust gas (EGR gas), and the heater 140 is provided to warm up indoor air of a vehicle.

The radiator 145 is disposed to radiate heat of the coolant to outside, the EGR valve 150 controls a flow rate of the EGR gas in the EGR line, and the oil cooler 155 disposed to cool the oil recirculating the engine.

In the coolant control valve unit 120, the reservoir tank 170 is disposed on a separate line diverged from a coolant line connected with the radiator 145, and the reservoir tank 170 collects bubbles contained in the coolant or supplements the coolant to the cooling system.

The safety valve 135 is a thermostat operating by a coolant temperature, and when the coolant control valve unit 120 is out of order and the coolant temperature is overheated, a bypass passage connected with the radiator 145 is opened. Accordingly, when the safety valve 135 operates, the coolant recirculates the radiator 145.

In an exemplary embodiment of the present disclosure, the coolant components are substantially for using coolant, and may include the cylinder head, a cylinder block, an oil cooler, an EGR cooler, a heater, a radiator, a transmission oil warmer, and an EGR valve etc.

Figure 2:
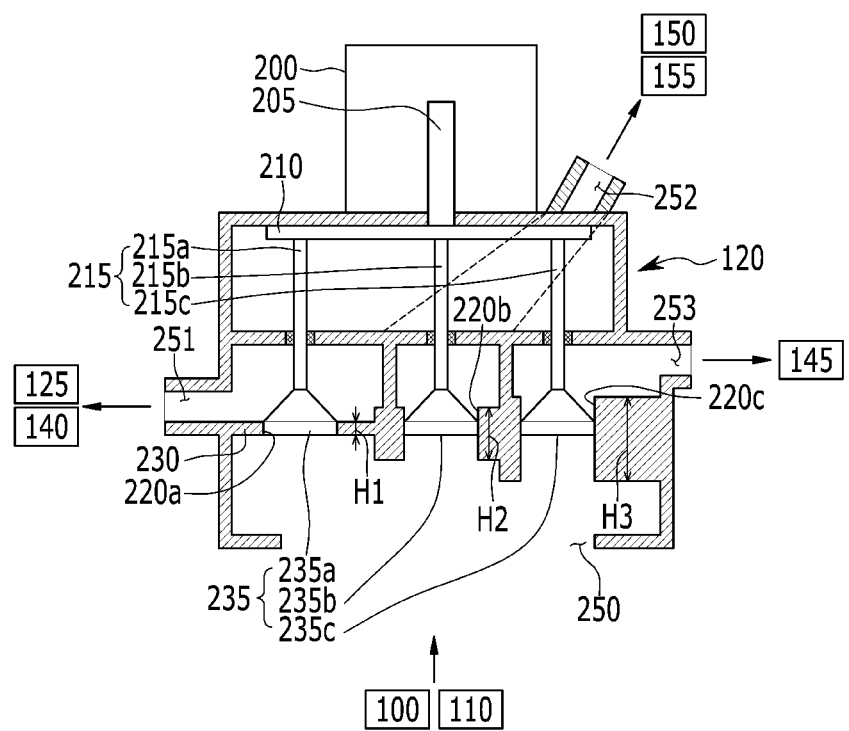
FIG. 2 is a cross-sectional view of a state that the first, second and third passages are closed in the coolant control valve unit according to an exemplary embodiment of the present disclosure.

FIG. 2 is a cross-sectional view of a state that the first, second and third passages are closed in the coolant control valve unit according to an exemplary embodiment of the present disclosure.

Referring to FIG. 2, the coolant control valve unit 120 includes a valve housing 230, a first passage 220a, a second passage 220b, a third passage 220c, a valve 235, a stem 215, a driving plate 210, a driving rod 205, an actuator 200, an inlet 250, a first outlet 251, a second outlet 252, a third outlet 253.

The valve 235 may include a first valve 235a, a second valve 235b and a third valve 235c, and the stem 215 may include a first stem 215a, a second stem 215b and a third stem 215c.

Coolant is respectively supplied to the inlet 250 from the cylinder head 100 or the cylinder block 110, and the supplied coolant may be distributed to each coolant component through the first outlet 251, the second outlet 252 and the third outlet 253.

The first valve 235a opens the first passage 220a to supply the coolant entered into the inlet 250 to the low pressure EGR cooler 125 and the heater 140. Further, the second valve 235b opens the second passage 220b to supply the coolant entered into the inlet 250 to the EGR valve 150 and the oil cooler 155. Further, the third valve 235c opens the third passage 220c to supply the coolant entered into the inlet 250 to the radiator 145.

A lower end of the first stem 215a is connected with a center portion of the upper surface of the first valve 235a, a lower end of the second stem 215b is connected with a center portion of the upper surface of the second valve 235b, and a lower end of the third stem 215c is connected with a center portion of the upper surface of the third valve 235c. In particular, the first stem 215a, second stem 215b and the third stem 215c extend upwardly in parallel.

Each upper end of the first stem 215a, the second stem 215b and the third stem 215c is connected with a lower surface of the driving plate 210, a lower end portion of the driving rod 205 is connected with a center portion of the upper surface, and the driving rod 205 extends to upwardly.

The actuator 200 pulls the driving rod 205 upwards or pushes downwards, and the actuator 200 moves the first, second and third valves 235a, 235b and 235c upwards and downwards by the first, second and third stems 215a, 215b and 215c. Accordingly, an opening rate of each of the first, second and third passages 220a, 220b and 220c may be controlled.

In an exemplary embodiment of the present disclosure, the first passage 220a has a first length H1, the second passage 220b has a second length H2, and the third passage 220c has a third length H3. Accordingly, the first passage 220a is opened, then the second passage 220b is opened, and then the third passage 220c is finally opened according to movement of the driving plate 210.

Preferably, the third length H3 is larger than the second length H2, and the second length H2 is larger than the first length H1.

Referring to FIG. 2, the actuator 200 raises the driving plate 210, and the first, second and third valves 235a, 235b and 235c close the first, second and third passage 220a, 220b and 220c. Accordingly, coolant supplied from the inlet is not distributed to the coolant components.

Figure 3:
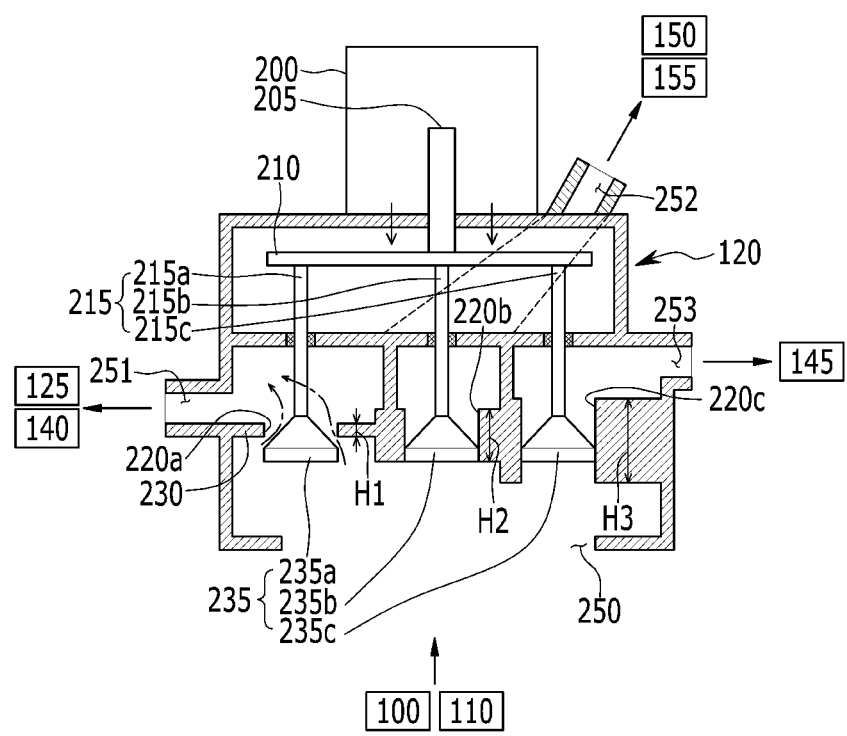
FIG. 3 is a cross-sectional view of a state that the first passage is opened in the coolant control valve unit according to an exemplary embodiment of the present disclosure.

FIG. 3 is a cross-sectional view of a state that the first passage is opened in the coolant control valve unit according to an exemplary embodiment of the present disclosure.

Referring to FIG. 3, the actuator 200 initially descends the driving plate 210, and then the first valve 235a opens the first passage 220a. Then, the second and third valves 235b and 235c maintain to close the second and third passages 220b and 220c.

Accordingly, the coolant supplied through the inlet 250 is supplied to the low pressure EGR cooler 125 and the heater 140, whereas the coolant is not distributed to the EGR valve 150, the oil cooler 155 and the radiator 145.

Figure 4:
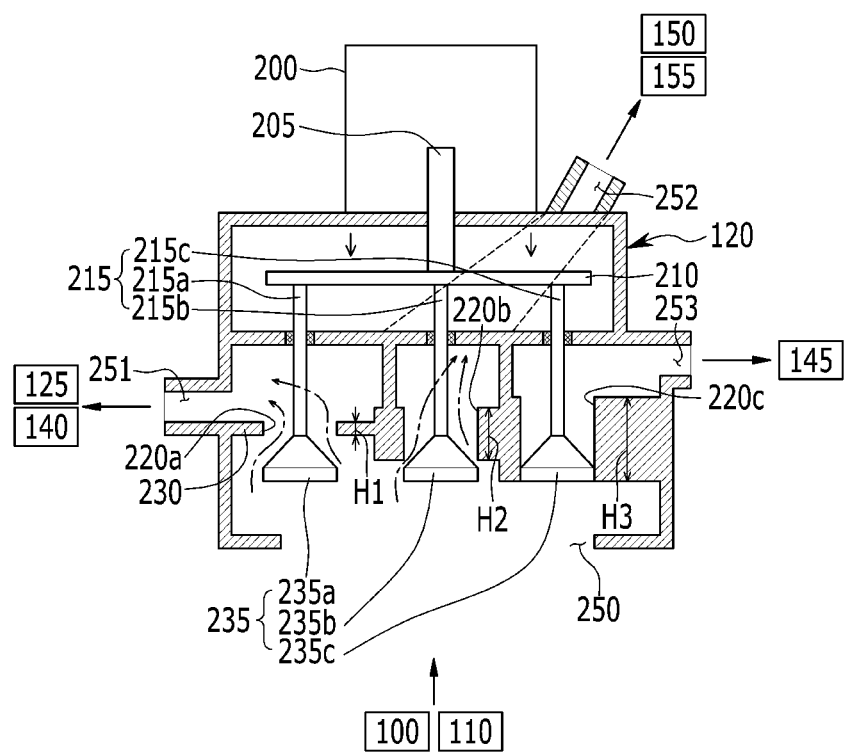
FIG. 4 is a cross-sectional view of a state that the first and second passages are opened in the coolant control valve unit according to an exemplary embodiment of the present disclosure.

FIG. 4 is a cross-sectional view of a state that the first and second passages are opened in the coolant control valve unit according to an exemplary embodiment of the present disclosure.

Referring to FIG. 4, the actuator 200 descends the driving plate 210 further, and the first and second valves 235a and 235b open the first and second passages 220a and 220b respectively. Then, the third valve 235c maintains to close the third passage 220c.

Accordingly, the coolant supplied through the inlet 250 is supplied to the low pressure EGR cooler 125, the heater 140, the EGR valve 150 and the oil cooler 155, and the coolant is not distributed to the radiator 145.

Figure 5:
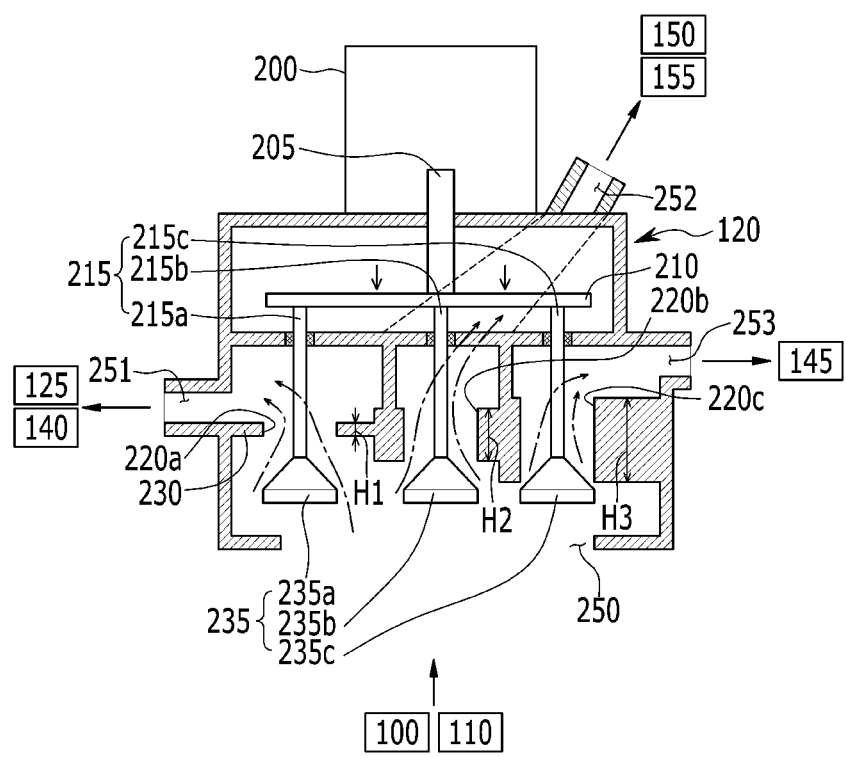
FIG. 5 is a cross-sectional view of a state that the first, second and third passages are opened in the coolant control valve unit according to an exemplary embodiment of the present disclosure.

FIG. 5 is a cross-sectional view of a state that the first, second and third passages are opened in the coolant control valve unit according to an exemplary embodiment of the present disclosure.

Referring to FIG. 5, the actuator 200 descends the driving plate 210 further, and the first, second and third valves 235a, 235b and 235c opens the first, second and third passages 220a, 220b and 220c respectively.

Accordingly, the coolant supplied through the inlet 250 is supplied to the low pressure EGR cooler 125, the heater 140, the EGR valve 150, the oil cooler 155 and the radiator 145.

Figure 6:
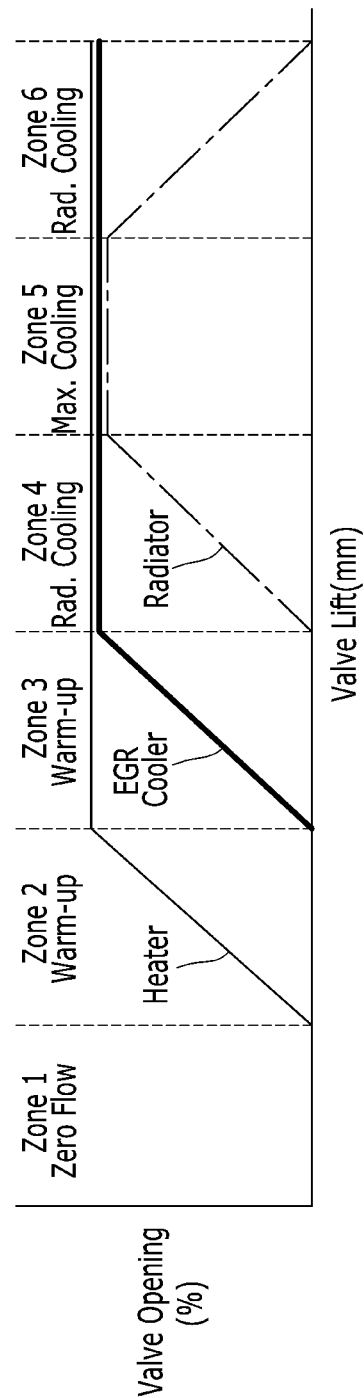
FIG. 6 is a graph of opening strategy of the coolant control valve unit according to an exemplary embodiment of the present disclosure.

FIG. 6 is a graph of opening strategy of the coolant control valve unit according to an exemplary embodiment of the present disclosure.

Referring to FIG. 6, a horizontal axis shows a valve lift of the driving plate 210, the first, second and third stems 215a, 215b and 215c, the first, second and third valves 235a, 235b and 235c, and the units are mm Also, a vertical axis shows a valve opening of the first, second and third passages 220a, 220b and 220c, and the units are %.

Zone1 is a zero flow region, and the first, second and third valves 235a, 235b and 235c close the first, second and third passages 220a, 220b and 220c.

Zone2 is a warm-up region, and the first valve 235a controls the valve opening of the first passage 220a, and the second and third valves 235b and 235c close the second and third passage 220b and 220c.

Zone3 is a warm-up region, and the first valve 235a opens the first passage 220a, the second valve 235b controls the valve opening of the second passage 220b, and the third valve 235c closes the third passage 220c.

Zone4 is a radiator cooling region, and the first valve 235a opens the first passage 220a, the second valve 235b opens the second passage 220b, and the third valve 235c controls the valve opening of the third passage 220c.

Zone5 is a maximum cooling region, and the first valve 235a opens the first passage 220a, the second valve 235b opens the second passage 220b, and the third valve 235c also opens the third passage 220c.

Zone6 is a radiator cooling region, and the first valve 235a opens the first passage 220a, the second valve 235b opens the second passage 220b, and the third valve 235c controls the valve opening of the third passage 220c.

In FIG. 6, the graph of the lift and the valve opening shows a tendency characteristic, and it may have different data from real data, and illustrated for understanding of the present disclosure.

According to an exemplary embodiment of the present disclosure, the coolant control valve unit 120 may include a valve housing 230 including at least a first passage 220a and a second passage 220b in which the coolant flows and disposed at a predetermined position, a first valve 235a and a second valve 235b provided to open and close the first and second passages 220a and 220b, a first stem 215a and a second stem 215b respectively connected with the first valve 235a and the second valve 235b and extending to movement directions of the first valve 235a and the second valve 235b, a driving plate 210 of which one surface is connected with end portions of the first stem 215a and the second stem 215b, and an actuator 200 pushing and pulling the driving plate 210 to allow the first valve 235a and the second valve 235b to open and close the first passage 220a and the second passage 220b, wherein the first passage 220a and the second passage 220b respectively have a first length H1 and a second length H2 which are predetermined such that initially the first passage 220a is opened and then the second passage 220b is opened while the actuator 200 lifts the first valve 235a and the second valve 235b by the driving plate 210.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A coolant control valve unit, comprising:
   a valve housing including at least a first passage and a second passage in which coolant flows and disposed at a predetermined position;
   a first valve and a second valve provided to open and close the first and second passages;
   a first stem and a second stem respectively connected with the first valve and the second valve and extending to movement directions of the first valve and the second valve;
   a driving plate of which one surface is connected with end portions of the first stem and the second stem; and
   an actuator pushing and pulling the driving plate to allow the first valve and the second valve to open and close the first passage and the second passage,
   wherein the first passage and the second passage respectively have a first length and a second length which are predetermined such that initially the first passage is opened and then the second passage is opened while the actuator lifts the first valve and the second valve by the driving plate.

2. The coolant control valve unit of claim 1, further comprising:
   a third valve provided to open and close a third passage which is formed in the valve housing; and
   a third stem connected with the third valve, extending to a movement direction of the third valve, and an end portion of which is connected with one surface of the driving plate,
   wherein the third passage has a third length which is predetermined such that initially the first passage is opened, then the second passage is opened, and then the third passage is opened while the actuator lifts the first valve, the second valve and the third valve by the driving plate.

3. The coolant control valve unit of claim 2, wherein the second length is larger than the first length, and the third length is larger than the second length.

4. The coolant control valve unit of claim 2, wherein inlets into which the coolant enters through one side of the first valve, the second valve and the third valve are provided at the valve housing.

5. The coolant control valve unit of claim 2, wherein the valve housing includes:
a first outlet from which the coolant that passed through the first passage is discharged by opening of the first valve;
a second outlet from which the coolant that passed through the second passage is discharged by opening of the second valve; and
a third outlet from which the coolant that passed through the third passage is discharged by opening of the third valve.

6. The coolant control valve unit of claim 1, further comprising:
a driving rod connected with the other surface of the driving plate, and
the actuator pushes or pulls the driving rod.

7. An engine cooling system, comprising:
a cylinder head disposed on a cylinder block; and
a coolant control valve unit disposed at a coolant outlet of the cylinder head and to which coolant discharged from the cylinder head and the cylinder block is supplied and distributing the supplied coolant to coolant components,
wherein the coolant control valve unit includes:
a valve housing including at least a first passage and a second passage in which the coolant flows and disposed at a predetermined position;
a first valve and a second valve provided to open and close the first and second passages;
a first stem and a second stem respectively connected with the first valve and the second valve and extending to movement directions of the first valve and the second valve;
a driving plate of which one surface is connected with end portions of the first stem and the second stem; and
an actuator pushing and pulling the driving plate to allow the first valve and the second valve to open and close the first passage and the second passage,
wherein the first passage and the second passage respectively have a first length and a second length which are predetermined such that initially the first passage is opened and then the second passage is opened while the actuator lifts the first valve and the second valve by the driving plate.

8. The engine cooling system of claim 7, further comprising:
a third valve provided to open and close a third passage which is formed in the valve housing; and
a third stem connected with the third valve, extending to a movement direction of the third valve, and an end portion of which is connected with one surface of the driving plate,
wherein the third passage has a third length H3 which is predetermined such that initially the first passage is opened, then the second passage is opened, and then the third passage is opened while the actuator lifts the first valve, the second valve and the third valve by the driving plate.

9. The engine cooling system of claim 8, wherein the second length is larger than the first length, and the third length is larger than the second length.

10. The engine cooling system of claim 8, wherein inlets into which coolant enters through one side of the first valve, the second valve and the third valve are provided at the valve housing.

11. The engine cooling system of claim 8, wherein the valve housing includes:
a first outlet from which the coolant that passed through the first passage is discharged by opening of the first valve;
a second outlet from which the coolant that passed through the second passage is discharged by opening of the second valve; and
a third outlet from which the coolant that passed through the third passage is discharged by opening of the third valve.

12. The engine cooling system of claim 8, wherein the third passage is connected with a radiator radiating the heat of the coolant to outside.

13. The engine cooling system of claim 7, further comprising:
a driving rod connected with the other surface of the driving plate, and
the actuator pushes or pulls the driving rod.

14. The engine cooling system of claim 7, wherein the first passage is connected with a low pressure EGR cooler cooling the exhaust gas recirculating from an exhaust line to an intake line and a heater disposed to warm up indoor air of a vehicle.

15. The engine cooling system of claim 7, wherein the second passage is connected with an EGR valve installed at an EGR line to control flow rate of the recirculating exhaust gas and an oil cooler disposed to cool the oil recirculating the cylinder block and the cylinder head.

* * * * *